Patented Oct. 16, 1951

2,571,884

UNITED STATES PATENT OFFICE 2,571,884

METHOD OF PREPARING CHLOROSILOXANES

James Franklin Hyde, Corning, N. Y., assignor to Dow Corning Corporation, Midland, Mich., a corporation of Michigan No Drawing. Application July 19, 1950,
Serial No. 174,805

7 Claims. (Cl. 23—14)

This invention relates to a method of preparing chlorosiloxanes.

Polymeric chlorosiloxanes of the formula $Cl_3Si[OSiCl_2]_xCl$ have been prepared heretofore by the partial hydrolysis of silicon tetrachloride. This procedure produces large amounts of silica gel and is difficult to control. Furthermore, the yield of lower members of the series is exceedingly low.

It is an object of the present invention to provide a method for the preparation of chlorosiloxanes which produces high yields of the lower members of the series. Another object is to provide an economical method for the production of hexachlorodisiloxane. Other objects and advantages will be apparent from the following description.

In accord with this invention $SiCl_4$ is reacted with a metallic oxide selected from the group consisting of $MnO_2$, CuO, $Cu_2O$, CaO, ZnO, MgO, $Fe_2O_3$, $Ag_2O$, and HgO in the presence of a solvent selected from the group consisting of liquid saturated aliphatic and liquid aromatic nitriles and liquid saturated aliphatic and liquid aromatic nitro compounds, there being at least one mol of $SiCl_4$ per mol of oxide. The solvent is present in amount of at least 1 per cent by weight based upon the silicon tetrachloride.

The applicant has found that when certain metallic oxides are mixed with silicon tetrachloride in the presence of nitriles and nitro compounds, reaction begins at once to produce chlorosiloxanes of the formula $Cl_3Si[OSiCl_2]_xCl$ where $x$ has a value of at least 1. The molecular size distribution of the chlorosiloxanes varies with the relative proportion of oxide and silicon tetrachloride. With a large molar excess of silicon tetrachloride, the predominant products are chlorosiloxanes where $x$ is from 1 to 5. When the amount of oxide in mols is approximately equal to the mols of $SiCl_4$ employed, higher molecular weight, non-volatile chlorosilanes are obtained.

Reaction between the silane and oxide proceeds at temperatures ranging from 30° C. up. Normally, the reaction is carried out at the reflux temperature of the mixture.

The reaction of this invention does not take place in the absence of the defined solvents. Any liquid saturated aliphatic nitrile or liquid aromatic nitrile and any liquid saturated aliphatic nitro compound or liquid aromatic nitro compound produces a reaction between the above defined oxides and silicon tetrachloride to produce chlorosiloxanes. Examples of such nitriles are acetonitrile, propionitrile, butyronitrile, valeronitrile, benzonitrile, cyclohexonitrile, and capronitrile. Examples of the nitro compounds are nitromethane, nitroethane, nitropropane, nitrooctahe, nitrobenzene, nitrotoluene, and nitrocyclohexane.

There should be at least 1 per cent by weight of the solvent, relative to the silicon tetrachloride. If the solvent is present in smaller amounts, the reaction will not proceed at a reasonable rate. Any amount of solvent, in excess of 1 per cent, may be employed without deleteriously affecting the reaction. Normally, the amount of solvent used varies from 1 to 20 per cent by weight based upon the weight of the silicon tetrachloride.

Whereas certain other metallic oxides react with silicon tetrachloride in the presence of the solvents of this invention, only the herein defined oxides produce chlorosiloxanes when employed in the method of this invention. It is often desirable to employ a small amount of $CuCl_2$ and $HgCl_2$ in order to hasten the reaction. The amount of catalyst normally employed is about .1 g. per mol of $SiCl_4$. In the presence of such a catalyst the reaction is greatly speeded up. The catalysts are more effective with the lighter metal oxides, such as CaO, MgO, and ZnO.

The chlorosiloxanes prepared herein are useful as intermediates in the preparation of organosiloxanes. The chlorosiloxanes may also be employed as one of the copolymers in siloxane resins.

Reaction between the oxides and silicon tetrachloride is believed to proceed in a step-wise fashion through the formation of a metal complex of the formula $Cl_xMOSiCl_3$ where $x$ is 0, 1, or 2. Evidence for this mechanism is supplied by the fact that such complexes were isolated in each run made in this invention. The metal complexes are dry powdery materials which are difficultly soluble in organo solvents.

The following examples are illustrative only and should not be construed as limiting the invention.

*Example 1*

A mixture of .13 mol of $MnO_2$ and .1 g. of $HgCl_2$ was added in small proportions to a refluxing mixture of .84 mol of $SiCl_4$ and 23.5 g. of acetonitrile. The addition of the oxide required 4 hours. The reaction mixture was refluxed for three days and then distilled. During reaction, chlorine was evolved. There was obtained unreacted silicon tetrachloride and a mixture of $Cl_3SiOSiCl_3$, $Cl_3SiOSiCl_2OSiCl_3$, $Cl_3Si[OSiCl_2]_3Cl$, and $Cl_3Si[OSiCl_2]_4Cl$ B. R. 136° C. to 291° C. at atmospheric pressure. In addition, there was a dry powdery residue containing the compound $ClMnOSiCl_3$.

Example 2

A mixture of .196 mol of $Cu_2O$ and .1 g. of $CuCl_2$ was added in small proportions to a refluxing mixture of .792 mol of $SiCl_4$ and 35.2 g. of acetonitrile. After one day refluxing the mixture was distilled. After removal of unreacted silicon tetrachloride there was obtained a mixture of chlorides of the formula $$Cl_3Si[OSiCl_2]_xCl$$

where $x$ is 1 to 4 and a solid powdery residue containing $CuOSiCl_3$.

Example 3

.23 mol of CuO was added to a mixture of .97 mol of $SiCl_4$ and 22.4 g. of acetonitrile. The mixture was refluxed for 5 days and upon distillation $Cl_3SiOSiCl_3$ was obtained plus a solid residue containing a $ClCuOSiCl_3$.

Example 4

.19 mol of ZnO and .15 g. of $CuCl_2$ were added to a mixture of .96 mol of $SiCl_4$ and 25.8 g. of acetonitrile. The mixture was refluxed for one day and thereafter distilled. There was obtained a mixture of chlorides of the formula $Cl_3Si[OSiCl_2]_xCl$ and a dry residue containing $ClZnOSiCl_3$.

Example 5

A mixture of .169 mol of HgO, 1 mol of $SiCl_4$, and 34.3 g. of nitroethane was allowed to stand at room temperature for 18 hours. The mixture was distilled and there was obtained a mixture of chlorides of the formula $$Cl_3Si(OSiCl_2)_xCl$$

The powdery residue contained $ClHgOSiCl_3$.

Example 6

A mixture of .259 mol of MgO, 1.04 mols of $SiCl_4$, .16 g. of $CuCl_2$, and 28.2 g. of acetonitrile was refluxed for one day. Upon distillation of the mixture chlorosiloxanes of the formula $Cl_3Si(OSiCl_2)_xCl$, B. R. 180° C. to 262° C. at 15 mm. was obtained. The dry solid residue contained a compound $ClMgOSiCl_3$.

Example 7

A mixture of .25 mol of CaO, 1 mol of $SiCl_4$, .18 g. of $HgCl_2$, and 25.8 g. of acetonitrile was refluxed for one day. The mixture was distilled and there was obtained $Cl_3SiOSiCl_3$, $$Cl_3Si(OSiCl_2)_2Cl, Cl_3Si(OSiCl_2)_3Cl$$

and $Cl_3Si(OSiCl_2)_4Cl$. The dry powdery residue contained $ClCaOSiCl_3$.

Example 8

A mixture of .25 mol of $Fe_2O_3$, .98 mol of $SiCl_4$, .17 g. of $CuCl_2$, and 32.9 g. of acetonitrile was refluxed for three days. Chlorine was evolved. Upon distillation $Cl_3SiOSiCl_3$ was obtained together with a solid powdery residue containing $ClFeOSiCl_3$ and $Cl_2FeOSiCl_3$.

Example 9

A mixture of .24 mol of $Ag_2O$, 1.45 mols of $SiCl_4$ and 2.35 g. of acetonitrile was refluxed 12 hours and then distilled. There was obtained $Cl_3SiOSiCl_3$ together with a dry powdery residue containing $AgOSiCl_3$.

Example 10

CuO was reacted with $SiCl_4$ in the presence of propionitrile, valeronitrile, benzonitrile, nitrobenzene, nitromethane, and nitropropane at room temperature. In all cases compounds of the formula $Cl_3Si(OSiCl_2)_xCl$ were obtained.

That which is claimed is:

1. A method of preparing chlorosiloxanes which comprises reacting $SiCl_4$ with a metallic oxide selected from the group consisting of $MnO_2$, CuO, $Cu_2O$, CaO, ZnO, MgO, $Fe_2O_3$, $Ag_2O$, and HgO, there being at least one mol of $SiCl_4$ per mol of oxide, in the presence of a solvent selected from the group consisting of liquid saturated aliphatic nitriles, liquid aromatic nitriles, liquid aliphatic nitro compounds, and liquid aromatic nitro compounds, said solvent being present in amount of at least 1 per cent by weight based upon the weight of the silicon tetrachloride.

2. The method in accord with claim 1 wherein the oxide is CaO.

3. The method in accord with claim 1 wherein the oxide is MgO.

4. The method in accord with claim 1 wherein the oxide is CuO.

5. The method in accord with claim 1 wherein the oxide is ZnO.

6. A compound of the formula $Cl_xMOSiCl_3$ where M is a metal selected from the group consisting of Mn, Cu, Ca, Zn, Mg, Fe, Ag, and Hg, and $x$ has a value from 0 to 2.

7. A method of preparing chlorosiloxanes which comprises reacting $SiCl_4$ with a metallic oxide selected from the group consisting of $MnO_2$, CuO, $Cu_2O$, CaO, ZnO, MgO, $Fe_2O_3$, $Ag_2O$, and HgO, there being at least one mol of $SiCl_4$ per mol of oxide, in the presence of a solvent selected from the group consisting of liquid saturated aliphatic nitriles, liquid aromatic nitriles, liquid aliphatic nitro compounds, and liquid aromatic nitro compounds, said solvent being present in amount of at least 1 per cent by weight based upon the weight of the silicon tetrachloride, and in the presence of a catalyst selected from the group consisting of $CuCl_2$ and $HgCl_2$ in amount of about .1 g. of catalyst per mol of $SiCl_4$.

JAMES FRANKLIN HYDE.

No references cited.